United States Patent [19]
Anikanov et al.

[11] 3,934,709
[45] Jan. 27, 1976

[54] CONVEYORS FOR PILES OF NEWSPAPERS

[76] Inventors: Nikolai Ivanovich Anikanov, Bolshaya Bronnaya ulitsa, 2/6, kv. 6; Leonid Pavlovich Grachev, ulitsa Lva Tolstogo, 7, kv. 32; Grigory Avramovich Radutsky, 16 Parkovaya ulitsa, 49, korpus 2, kv. 68, all of Moscow; Rafail Efimovich Kheifets, Brest-Litovsky prospekt, 162, kv. 30, Kiev, all of U.S.S.R.

[22] Filed: Nov. 26, 1974

[21] Appl. No.: 527,232

[30] Foreign Application Priority Data
July 29, 1974  U.S.S.R............................. 2044111

[52] U.S. Cl................................ 198/158; 198/179
[51] Int. Cl.²....................................... B65G 15/00
[58] Field of Search............ 198/179, 180, 154–158, 198/236–239, 38

[56] References Cited
UNITED STATES PATENTS

| | | | |
|---|---|---|---|
| 2,681,727 | 6/1954 | Dersch................................ | 198/155 |
| 3,318,435 | 5/1967 | Scott.................................... | 198/38 |
| 3,847,272 | 11/1974 | Anikanov et al. .................. | 198/158 |

*Primary Examiner*—Robert J. Spar
*Assistant Examiner*—James M. Slattery
*Attorney, Agent, or Firm*—Holman & Stern

[57] ABSTRACT

The present invention relates to conveyors for the transportation of piles of newspapers and can be used with the utmost effictiveness for conveying piles of newspapers delivered by a web-fed rotary printing press.

The disclosed conveyor for piles of newspapers comprises a chain supporting carriages carrying clamps thereon in the form of fork-shaped flaps together making a closed receptacle for piles of newspapers, with one of the fork-shaped flaps having the prongs thereof bent at both ends toward the other one of the fork-shaped flaps, with the central part of each one of these prongs being a curved one, with the convex portion facing the same direction as the bent ends, and with the flaps being associated with flap opening mechanism. The disclosed structure provides for reliable retention of the newspapers in the clamp preventing displacement of the newspapers in the pile being conveyed.

2 Claims, 4 Drawing Figures

CONVEYORS FOR PILES OF NEWSPAPERS

BACKGROUND OF THE INVENTION

The present invention relates to conveying means in the printing arts industry and, more particularly, it relates to conveyors for the transportation of piles of newspapers.

The invention can be used to the utmost effectiveness for conveying piles of newspapers delivered by a delivery arrangement of a web-fed rotary printing press.

At present, newspapers delivered in a continuous stream by the folder of a web-fed rotary printing press are conveyed by means of a conveyor comprising a driven endless chain having carriages mounted thereof for joint travel therewith. Each carriage, in its turn, has clamps mounted thereon for gripping each newspaper in the stream by its side margins, said clamps being actuated by stationary cams.

This known conveyor provides for the reliable transportation of individual newspapers, however, it cannot be used for conveying piles of newspapers.

Conveyors are presently being developed for the newspaper industry for piles of newspapers, comprising a driven three-dimensional endless chain having mounted thereon carriages for travelling jointly therewith. Each carriage has mounted thereon in a cantilever fashion rods with platforms adapted to support piles of newspapers, with the platforms being retained against rocking by a corresponding retaining means during motion of the chain.

These conveyors ensure the reliable conveyance of piles of newspapers with the platforms being retained against rocking; however, this structure is fit predominantly for conveyors having no portions thereof where the plane of the travel varies. Otherwise, it is necessary to provide at such portions additional means for ensuring the strictly horizontal position of the platforms with the piles thereon, as the latter might fall off the platforms.

The provision of such additional means complicates the structure of the conveyor; furthermore, it puts stricter requirements as to the accuracy of the manufacture of the known conveyors.

In a pending application by the same inventors, a conveyor has been disclosed in detail for piles of newspapers, which incorporate clamps comprising spring-biased fork-shaped flaps mounted on the conveyor chain for alternating rotation for the opening and closing of the flaps at loading and unloading stations of the conveyor.

Since the folds of the newspapers in each pile leaving the web-fed rotary press are rotated through 180° relative to the preceding pile, the flaps with their bent-away prongs in each clamp in the known conveyor are alternatingly inclined toward the folds of the newspapers in the pile being conveyed. The flaps are opened by means of followers fixed directly on the flaps, and engageable by stationary cams positioned at the loading and unloading areas.

Although the above-described conveyor is structurally simple and provides for facilitated loading and unloading of the clamps, as well as for three-dimensional conveying of the piles, this conveyor requires, however, in order to prevent displacement of the piles in the clamps, the necessity to ensure uniform clamping of the piles at several points along their margin, which is a relatively complicated task.

Besides, due to the necessity of alternatingly mounting clamps with flaps having their prongs inclined in opposite directions on the conveyor to conform to the position of the folds in the successive piles, a certain difficulty is encountered when the associated web-fed rotary press is being started. This is explained by the fact that prior to starting the rotary press, it is necessary to match the operation of its delivery with the position of the respective clamps of the conveyor, because when the operation of printing is either halted or completed, the conveyor operates independently of the press. Let us explain this in some more detail. In operation of the conveyor, which is driven indepenently of the web-fed rotary press, a clamp arriving at either the loading or unloading area may have its flaps inclined, e.g. to the right, whereas at the same moment the pile of newspapers leaving the delivery of the rotary press may have the folds facing to the left. Therefore, in order to clamp this particular pile, the conveyor must be halted and a clamp appropriate to this particular pile should be brought to the loading area, which involves a loss of time, and hinders the operation of the printing-conveying complex.

It should be also mentioned that the rotation of the flaps by the interaction of their own followers with stationary cams has been found to require highly accurate manufacturing and accurate positioning of the stationary cams.

SUMMARY OF THE INVENTION

It is an object of the present invention to create a conveyor for piles of newspapers, which should provide for the reliable retention of the newspapers in the piles against displacement during transportation.

It is an important object of the present invention to create a conveyor for piles of newspapers, which provides for the reliable opening and closing of the clamps at the loading and unloading areas of the conveyor.

It is a further object of the present invention to create a conveyor for piles of newspapers, which are of a simple and easily operable structure.

It is still another object of the present invention to create a conveyor which is operable along any three-dimensional path including portions where the plane of travel of the conveyor varies.

These and other objects are accomplished in a conveyor for piles of newspapers comprising a driven three-dimensional endless chain having mounted thereon, for joint travel therewith, a plurality of newspaper-carrying carriages, in which conveyor, in accordance with the invention, each carriage has mounted thereon a clamp consisting of two fork-shaped spring-biased flaps making together a closed receptacle adapted to accommodate therein a pile of newspapers, one of the two forks having the prongs thereof bent at both ends toward the other fork, the central portion of each said prong of said one fork being curved to form a convex portion facing the same direction as the said bent ends, the two flaps being associated with a flap opening mechanism including two coaxially arranged tubes of which the internal one is relatively stationary and has a rectangular slot cut therein, the external tube carrying the said flaps and having a helical slot cut therein, the external tube being rotatable about the internal one, a stud with a follower thereon extending through said two slots, the follower being adapted to engage at the loading and unloading areas the respective stationary cams, which engagement resulting in the rotation of said external tube relative to said internal tube, whereby said flaps are opened. The provision of the fork-shaped flaps with the prongs being bent at both ends and which are curving at the centre thereof provides for the fixed retention of a pile in the clamp, i.e. prevents the displacement of the newspapers in the pile during transportation. This is due to the fact that the convex portions of the prongs of the flap offers something like a reinforcement rib for the pile and retains it at the bending points along the margins of the newspapers. Besides, the provision of this flap enables the clamping of piles irrespectively of the position of the folds in these piles. This has become possible owing to the fact that the apex of the convex portion divides the space intermediate of the bent ends of the prongs of the flap into two equal sub-spaces, with each affording a recess for the folds of the newspapers. Therefore, irrespective of the position of the folds in a pile, each pile is reliably and easily accommodated in the clamp.

With the flap opening mechanism consisting of tubes with slots receiving a stud therein with the follower, the entire structure of the conveyor is simplified, since in this case the cam's stationary position for engagement of the follower can be rectilinear. It has become possible because the follower has been transferred from the movable flaps, as was the case with the hitherto known conveyors, onto the stud movable in the plane of the arrangement of the flaps.

In accordance with a preferred embodiment of the present invention all the apices of the convex portions of the respective prongs of the fork belong to one plane, so to render the pile of the newspapers more rigid during transportation.

For the present invention to be better understood, there follows hereinbelow a description of an embodiment of the invention, with reference being had to the accompanying drawings, wherein:

DESCRIPTION OF THE PREFERRED EMBODIMENT

Figure 1:
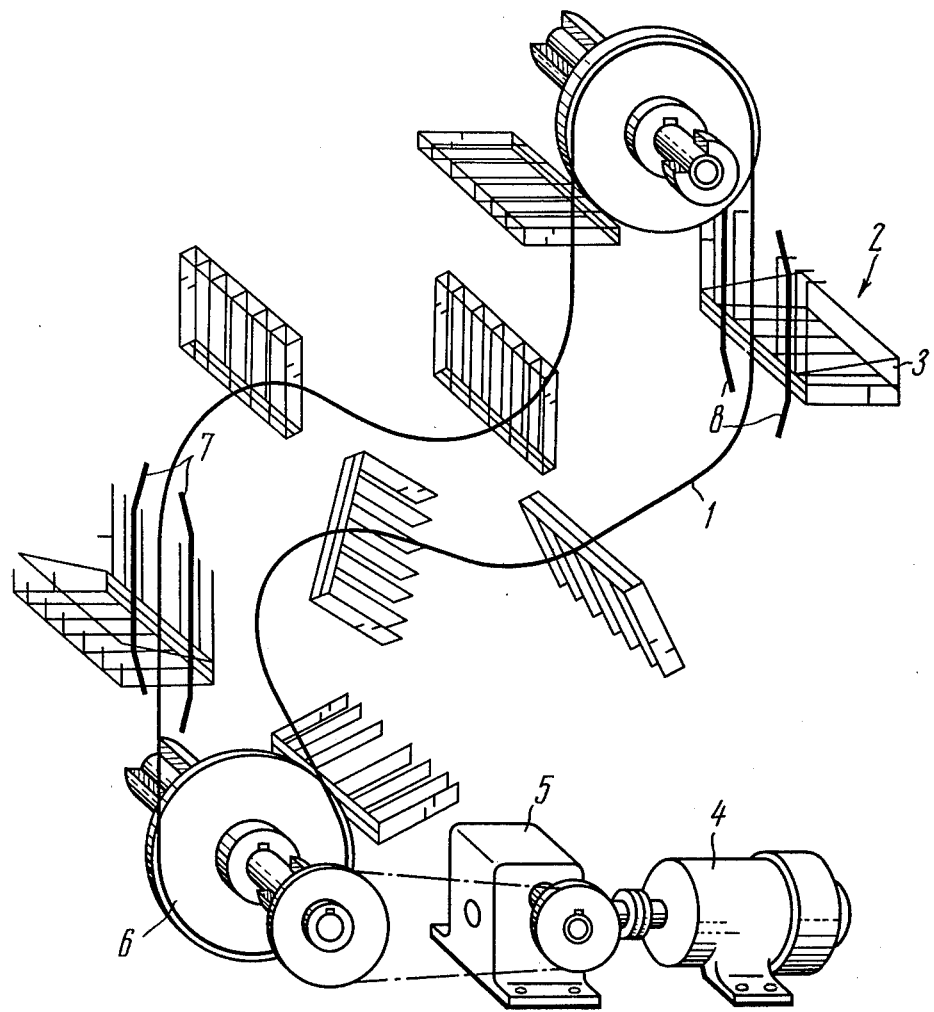
FIG. 1 is a schematic perspective view of the herein disclosed conveyor for piles of newspapers.
Figure 2:
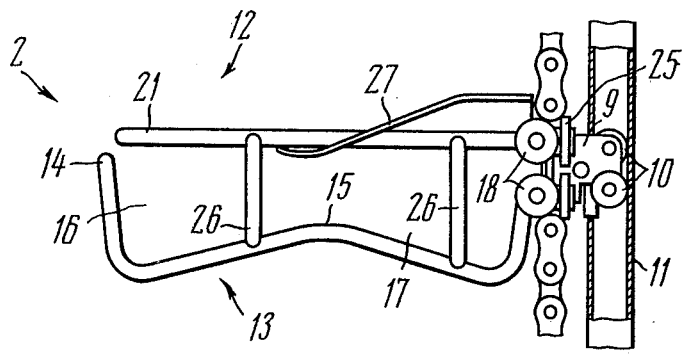
FIG. 2 is a side elevation of a clamp with the flaps together making a closed receptacle.

The herein disclosed conveyor comprises a driven three-dimensional endless chain 1 (FIG. 1) carrying clamps 2 uniformly spaced therealong for piles 3 of newspapers. The chain 1 is driven by an electric motor 4 through a reducing gear 5 and a driving sprocket 6. As it can be seen from the drawing, FIG. 1 the path of the chain has several portions whereat the plane of its travel varies, with the chain running vertically at the loading and unloading areas where stationary cams 7 and 8 are mounted, respectively. The chain 1 carries thereon carriages 9 (FIG. 2), each having its wheels 10 running along guideways 11 arranged congruently with the path of the chain 1. The carriages 9 support thereon the clamps 2 of which each clamp 2 is defined by two spring-biased fork-shaped flaps 12 and 13 forming together a closed receptacle adapted to accommodate therein a pile of newspapers.

Flap 13 has the prongs 14 thereof having their ends bent toward the other flap 12, with the central portions of the prongs 14 being curved to form convex portions 15 facing the same direction as the bent ends of the prongs 14. The apex of each convex portion 15 divides the space between the bent ends of the prongs 14 into two symmetrical sub-spaces 16 and 17, each offering a recess for a pile of newspapers. As a result, a pile of newspapers is reliably and positively clamped in the receptacle, irrespectively of the position of the folds of the newspapers in the pile. This is explained by the fact that the apex of the convex portion 15 offers a reinforcement rib to the pile of the newspapers and enables it to retain the pile at the points of bending of the newspapers along their margins.

Figure 3:
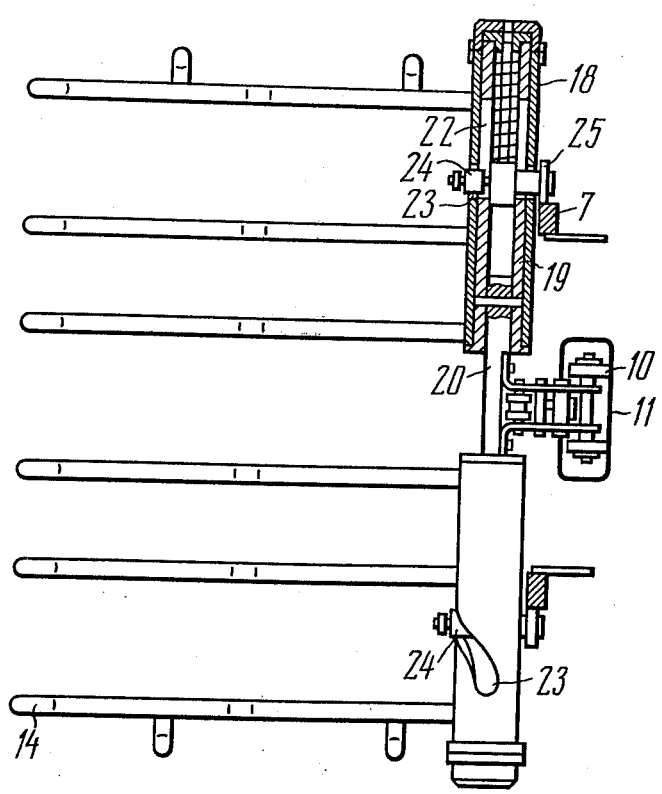
FIG. 3 is a longitudinally sectioned plan view of the flap opening mechanism.

In order to open the flaps 12 and 13, there is provided a mechanism including two coaxially arranged tubes 18 and 19 (FIG. 3), with the tube 19 being the internal one, and being fixedly secured on the shaft 20 of the clamp 2, whereas the external tube 18 is mounted for rotation about the internal tube 19 and has mounted thereon prongs 21 of the flap 12, and prongs 14 of the flap 13.

The tubes 18 and 19 have slots 22 and 23 made therein respectively, with the slot 22 being a rectangular one, while the slot 23 is helical. These slots are aligned and receive therein a stud 24 with a follower 25, which are adapted to engage the cams 7 and 8 mounted at the areas of loading and unloading the clamps 2.

Figure 4:
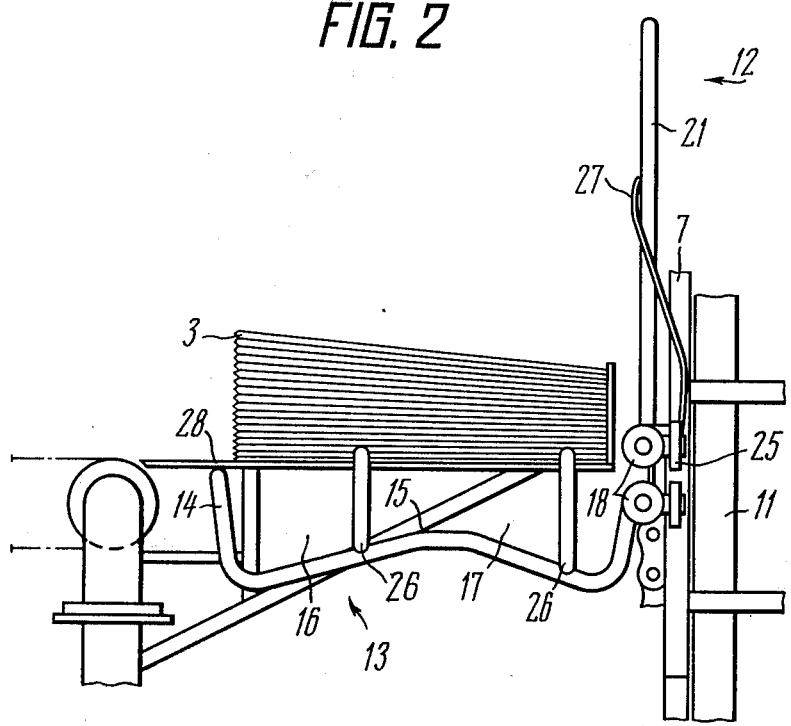
FIG. 4 is a side elevation of the clamp at the position of loading newspapers thereinto.

The result of this engagement is the opening of either of the flaps 12 or flaps 13, as can be seen in FIG. 4.

The side walls of the receptacle are defined by pins 26 fastened to the prongs 14 of the flap 13. A spring-urged panel 27 effects additional retention of a pile in the clamp 2.

Piles 3 of newspapers delivered by the associated web-fed rotary printing press (not shown in the drawings) are brought onto a fork-shaped table 28 from which the piles are loaded into the successive clamps 2.

The herein disclosed conveyor operates, as follows. As the electric motor 4 is energized, the chain 1 with the carriages 9 starts moving along its three-dimensional path. At the area of loading the clamps 2, the engagement of the respective follower 25 associated with the flap 12 with the cam 7 results in the stud 24 being displaced along the slot 22, whereby the flap 12 is rotated owing to the stud 24 being also displaced along the helical path 23, in which way the clamp 2 is opened. As the prongs of the flap 13 pass between the prongs of the table 28, the flap 13 snatches the pile 3 of newspapers off with the table 28, the pile 3 being accommodated in this flap and acquiring its curving shape, whereby the pile becomes more rigid and offers an area where the newspapers may bend in order to follow the outline of the prongs for retaining the newspapers. As the chain 1 moves on, the follower 25 gradually rolls off the cam 7, and the stud 24 returns under the action of the spring into its initial position, whereby the flap 12 is closed, and the pile 3 of newspapers is reliably retained in the clamp 2. In this fixed position the pile 3 is conveyed toward the unloading area where the clamp 2 enters in an overturned position, i.e. with the flap 13 overlying the flap 12. Then the followers 25 associated with the flaps 13 engage the cams 8 in the above-described manner, whereby the flap 13 is first opened, and then the pile is taken off the flap 12, e.g. by a multi-run chain conveyor (not shown in the drawings). After having cleared the unloading area the clamp 2 is closed once again.

What we claim is:

1. A conveyor for piles of newspapers, comprising: an endless chain movable along a three-dimensional path having areas where piles of newspapers are loaded thereon and unloaded therefrom; means for effecting motion of said chain along said path; cam means mounted at said loading and unloading areas; carriages mounted on said chain for joint travel therewith; a clamp mounted on each said carriage and comprising two spring-urged flaps, each in the form of a fork, with the two flaps together making a closed receptacle adapted to accommodate therein a pile of newspapers; one of said two forks having prongs bent at both ends thereof toward the other one of said flaps and being curved centrally thereof to form a convex portion facing the same direction as said bent ends; two coaxially arranged tubes of which one is internal and the other one is external; said internal one of said tubes being relatively stationary and being secured on said respective carriage and having made therein a rectangular slot; said external one of said tubes having said flaps mounted thereon and having a helically shaped slot made therein, with said external tube being mounted for rotation about said internal tube; a stud extending through said slots; a follower fastened on said stud adapted to engage at said loading and unloading areas said cam means of said conveyor to effect rotation of said external tube relative to said internal tube, whereby the opening and closing of said flaps is effected.

2. The conveyor as claimed in claim 1, wherein all the apices of said convex portions of said curving prongs of said fork belong substantially to the same plane, so as to render a pile of papers being conveyed more rigid.

* * * * *